United States Patent [19]
Kelly

[11] Patent Number: 5,537,615
[45] Date of Patent: Jul. 16, 1996

[54] PRODUCTION OF AN IMAGE MODEL AND INSPECTION OF A PIXEL REPRESENTATION OF AN IMAGE

[75] Inventor: Bruce Kelly, Essex, England

[73] Assignee: The Governor and Company of the Bank of England, London, England

[21] Appl. No.: 74,385

[22] Filed: Jun. 10, 1993

Related U.S. Application Data

[62] Division of Ser. No. 639,076, Jan. 9, 1991, Pat. No. 5,255, 331, which is a continuation of Ser. No. 743,929, Jun. 12, 1985, abandoned, which is a continuation-in-part of Ser. No. 632,967, Jul. 20, 1984, abandoned.

[30] Foreign Application Priority Data

Jun. 22, 1984 [GB] United Kingdom ............... 8415996

[51] Int. Cl.⁶ ............................................ G06K 9/38
[52] U.S. Cl. .................. 382/270; 382/112; 382/220
[58] Field of Search ............................... 382/270, 271, 382/272, 273, 254, 232, 220, 112; 358/465, 466, 467

[56] References Cited

U.S. PATENT DOCUMENTS

| | | | |
|---|---|---|---|
| 4,041,456 | 8/1977 | Ott et al. | 340/146.3 R |
| 4,131,879 | 12/1978 | Ehrat | 340/146.3 H |
| 4,196,452 | 4/1980 | Warren et al. | 358/283 |
| 4,238,768 | 12/1980 | Mitsuya et al. | 358/135 |
| 4,280,144 | 7/1981 | Bacon | 358/280 |
| 4,349,846 | 9/1982 | Sekigawa | 358/280 |
| 4,369,463 | 1/1983 | Anastassiou et al. | 358/135 |
| 4,528,693 | 7/1985 | Pearson et al. | 382/47 |
| 4,554,593 | 11/1985 | Fox et al. | 358/282 |
| 4,554,594 | 11/1985 | Ciardiello et al. | 358/283 |
| 4,581,762 | 4/1986 | Lapidus et al. | 382/22 |
| 4,606,069 | 8/1986 | Johnsen | 382/56 |
| 4,653,112 | 3/1987 | Ouimette | 382/69 |

FOREIGN PATENT DOCUMENTS

| | | |
|---|---|---|
| 55-45948 | 11/1980 | Japan . |
| 2160644 | 10/1987 | United Kingdom . |

*Primary Examiner*—Jose L. Couso
*Attorney, Agent, or Firm*—Fitch, Even, Tabin & Flannery

[57] ABSTRACT

A method of inspecting a pixel for tolerable variation from a corresponding selected pixel in a master image comprises establishing a data word of which the bits each indicate whether or not all the master image pixels in the neighborhood of the selected pixel all have values (i.e. brightness values) within a respective range. A data word representing the value of the inspected pixel is compared simultaneously with the ranges of values associated with the bits of the data word, which provides gating for the comparisons.

15 Claims, 5 Drawing Sheets

PRODUCTION OF AN IMAGE MODEL AND INSPECTION OF A PIXEL REPRESENTATION OF AN IMAGE

This is a division of application Ser. No. 07/639,076, filed Jan. 1, 1991 now U.S. Pat. No. 5,255,331, which is a continuation of Ser. No. 06/743,929, filed Jun. 12, 1985, now abandoned, which is a Continuation-In-Part of Ser. No. 06/632,967, filed Jul. 20, 1984, now abandoned.

FIELD OF THE INVENTION

The present invention relates to the inspection of images and the production of special representations of images. One aspect of the invention relates to the inspection of an image pixel for tolerable correspondence with a master image pixel represented in special form and more particularly concerns the examination of an image, particularly the image of a document or object as represented in pixel form, and testing of the image pixels derived from the document or object. Another aspect of the invention concerns the production of an image model, represented in signal form, of an image, particularly of a document or object intended to be used as a master against which a large number of documents or objects are to be compared for acceptability. Another aspect of the invention concerns the testing of documents or objects using a special image model of a master image and a further aspect of the invention concerns apparatus for performing such testing. The invention is intended to be particularly suitable, though not confined to, the examination by machine of sheet-like objects such as printed documents, for example bank-notes or security documents, and may be used for the inspection of sheets generally, irrespective of the presence or absence of information on the sheets. The invention is also applicable to the examination of, for example, two-dimensional images of (three-dimensional) industrial components.

BACKGROUND TO THE INVENTION

Although, as just previously mentioned, the invention is not in its broad aspect necessarily confined to the examination of bank-notes, it is convenient to outline the problems giving rise to the present invention with respect to that particular application of the invention, since the existing problems which the present invention is intended to solve or at least alleviate are particularly acute in relation to banknotes.

Bank-notes are printed by a variety of printing processes which are necessarily complex. Bank-notes are not necessarily exactly the same yet the implementation of the limits of acceptability may vary according to the individual examiner. Owing to the inherent variations of printing processes, it is, as will be further explained hereinafter, particularly difficult to mechanise the process of examination owing to the difficulty of formulating an absolute criterion of acceptability of a bank-note using, for example, a master note which is agreed to constitute a perfect specimen. Another quite general problem is the variation even over the area of a bank-note of a criterion of acceptability. For example, what may be reckoned to be unacceptable in one region of a bank-note may be acceptable in another. One convenient example is that a particular imperfection occurring in the face of a Head of State or other person represented on a bank-note may reasonably be regarded as unacceptable whereas an imperfection of the same order of magnitude but occurring in some border region of the bank-note may be regarded as an acceptable imperfection. The variation in a criterion of acceptability may also occur in relation to, for example, industrial components of which particular dimensions must be made to a smaller tolerance than is acceptable in other dimensions.

A further difficulty in the development of a machine technique for the examination of bank-notes lies in the variability of the media which are used for their production. The paper may shrink or stretch and the printing medium, for example ink, may vary in consistency or density. All these factors produce minor variations which may in general be tolerable to the human eye, depending on where they occur, but represent severe difficulties in the development of a technique for examination of a bank-note by automatic means. In general, of which the foregoing are particular examples, if a machine is capable, as has been thought necessary hitherto, of resolving the finest detail in the bank-note then the more prone it is to the indication of imperfection even when imperfection is tolerable.

These various problems are accentuated if any attempt is made to examine by machine a large number of bank-notes individually and in particular in which is usually termed an "on-line" manner, that is to say when the examination of a bank-note is to be performed within the time interval between the presentation of successive bank-notes at some stage in the cycle of production thereof. The information content of a bank-note examined to a reasonable degree of resolution is very considerable and the development of a machine technique for the examination of bank-notes for acceptability is made difficult by the very high information rate at which a machine must operate if it is to be used "on-line".

BRIEF SUMMARY OF THE PRIOR ART

One technique for detecting, for example, printing flaws on a printed sheet by comparison with a reference sheet is to develop from the reference sheet a representation in the form of pixels, for example by controlled scanning of the reference sheet and to scan the printed sheet similarly to develop a like plurality of pixels so that each document pixel can be compared with each reference sheet pixel. However, such a technique (exemplified by GB-PS 834125) will suffer from all the difficulties noted in the foregoing, European Patent Application No. 0084137 discloses an apparatus for detection of flaws in currency having multiple registered images. Optical means scan a test note to provide a plurality of outputs each representative of a particular patch value of a particular scan line of the test note. Generating means provide a plurality of outputs each representative of a particular patch value of a particular scan line of a reference note which is generated in real time as the test note is scanned. The generating means includes means to ensure that each generated reference patch value is provided for comparison with the corresponding patch value of the test note. Each reference patch value is generated for any value of misregistration between the multiple images within a predetermined tolerance. However such an apparatus requires very great computing power and is unnecessarily complicated by the computation of the degree of misregistration of multiple images.

Other proposals for testing images are described in British Patent Specifications Nos. 1575607, 2038063, 2035549, 2035551 and 2105030 and French Patent Specification No. 2349862.

It may conveniently be mentioned at the present stage that the scanning of a sheet or document to produce a pixel representation thereof for comparison with a pixel representation of a master sheet or document is rendered complex by the practical impossibility of ensuring that every document is presented in exactly the same manner to a scanning instrument and in general there will be a translation error and a skew error in the scanned image. However, methods exist in computer graphic techniques for resolving both kinds of error and the present invention is not therefore concerned with or dependent on any particular technique for curing translation error or skew error in the scanning of a document or image. The aforementioned GB-PS 2035551 describes one form of skew correction system.

SUMMARY OF THE INVENTION

At the heart of previous approaches to the problem of scanning an image for acceptability having regard to a master image is the idea that one should consider the master image as perfect and consider the effect of aberrations relative thereto. However, the basis of the present invention lies in the idea of aberrating a master image in a manner which can provide a tolerance in acceptability better approximating to that applied by the human eye and which can be varied at will to provide acceptability criterian which can vary over a given image.

One aspect of the present invention concerns the preparation of a model of a master image in signal form and, broadly speaking, the present invention provides, according to this aspect of the invention, a method of representing, in signal form, a given pixel of an image, composed of a multiplicity of pixels, comprising defining a matrix composed of a multiplicity of pixels in the neighbourhood of the said given pixel; providing a first signal value when all said multiplicity of pixels have a brightness value (which may be a grey scale value) within a predetermined range of brightness values; and providing a second signal value when at least one of said pixels has a brightness value outside the aforementioned range. In effect this permits the testing of the brightness value of a selected pixel in a subsequently scanned image for correspondence with a predetermined range of brightness values common to a respective matrix of pixels defined in the neighbourhood of a master image pixel rather than testing pixel against pixel. As will become apparent from further explanation herein, there is a considerable degree of choice which can be exerted over the extent and configuration of the matrix of pixels which is used to represent a given pixel and over the range of brightness values which is selected for association witch the matrix of pixels. This permits a considerable degree of variation in an acceptability criterion.

In practice, since a master image is composed of a multiplicity of pixels, this aspect of the present invention envisages performing the aforementioned method so as to obtain an array of signals (preferably binary) values each representing the (binary) value of the matrix defined for a respective pixel. It will be appreciated that the term "array" is primarily intended to mean a set of values which can be arranged in appropriately ordered form; one advantage of this form of representation is the ease with which it can be stored and, as will be seen hereinafter, a particular convenience in a preferred manner of examining a scanned image.

Preferably, this aspect of the invention includes the development of a plurality of arrays of binary values in respect of the same pixel matrices, wherein the binary values are determined in each array by a respective one of a plurality of different ranges of brightness values. According to this manner of representation of an image, such as an image of a master document, there is defined for each pixel a matrix of pixels in the neighbourhood thereof and the aforementioned arrays provide, in effect, a digital word of which the bits which are of one particular value (conveniently 1) indicate whether all the pixels in the defined matrix have brightness values within the same respective range of brightness values; the data bits that are of the other binary value (0) indicate that, for the respective range of brightness values, at least one pixel in the respective matrix has a brightness value outside that range. Thus each pixel in a master image is represented not directly by its brightness value but by a form of representation which defines, in effect, a region, of controllable extent, of tolerable variation of a pixel in terms of position or brightness relative to a nominally corresponding master pixel. The benefits of such a representation are particularly obtained if the various ranges of brightness values extend, in combination, over a whole range of brightness values from a defined zero to a defined maximum, such as from 0 to binary 255 of a grey scale as normally expressed in 8-bit binary digital form, and it is also advantageous to allow each range to overlap a neighbouring range or ranges, but such is not essential to the invention in its broadest form.

The development of the signal model of a master image need not be direct or confined to a single stage. In particular the process of defining a pixel matrix may be reiterated at least once using the same or a different definition of neighbourhood to derive a final array of signal values. Moreover, the reversal of the matrix definition (so that "black" becomes "white" and vice versa) may be useful in some circumstances. In a second or subsequent reiteration each matrix may be defined with respect to a group of the original master image pixels.

The production of an image model of a master image or document in the manner previously set forth according to the invention may be, and in general is likely to be, a comparatively time consuming process, but this is of no great importance if, as is usual, the representation thereby produced is to be used as a master for testing a very great number of object images and thereby for the testing of a very large number of, for example, printed documents against a presumed standard or master document.

The significance of this aspect of the invention lies not in comparing a pixel value with the value of a master pixel or combination of master pixel values but in the comparison of the value of a selected pixel with a predetermined range of values common to a respective matrix of pixels defined in the neighbourhood of one or a group of the master image pixels. For the testing of a complete image or document, the testing of each individual pixel may be repeated for each of a multiplicity of pixels in a scanned image and providing signal indications of the occasions of non-correspondence of the value of a tested image pixel with the range with which it is compared. Preferably the brightness value of a selected pixel is tested, preferably simultaneously, with each of a plurality of ranges of brightness values common to the respective matrix. It will be noted that where, as previously mentioned, each master pixel is represented by a digital word of binary values which indicate whether all the pixels in the respective matrix fall within the respective range of brightness values or not, the digital word can be used to provide gating for simultaneous comparison of the brightness value of a pixel against the appropriate multiplicity of brightness ranges. This permits in fact the complete testing of a scanned image pixel value in real time and thus, provided that, as is currently possible, a document can be scanned sufficiently rapidly, the ensuing circuitry for testing the pixel values can readily be arranged to operate at a similar rate so that the method of testing proposed herein can conveniently be used for "on-line" examination at the rate of production of the objects such as bank-notes or other documents.

However, the method of testing proposed herein is of more general utility, since irrespective of its applicability in such "on-line" examination, the method of testing employing the particular form of representation of the master image or document substantially alleviates the difficulties generally noted previously herein.

DESCRIPTION OF A PREFERRED EMBODIMENT

Figure 1:
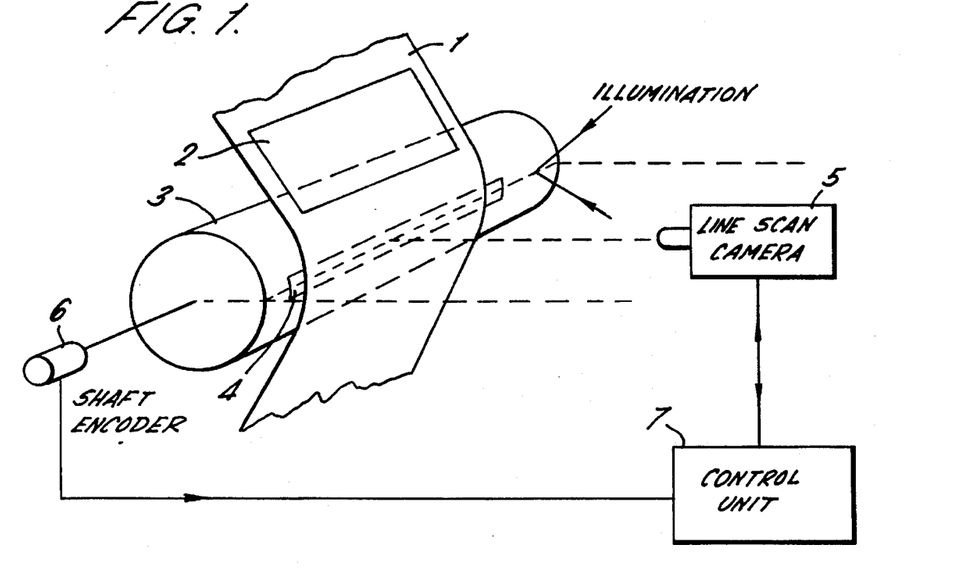
FIG. 1 is a schematic representation of the scanning of a web of printed matter;.

FIG. 1 illustrates, by way of example only, a sheet constituted by a continuous web 1 on which, normally at closely spaced intervals, is printed a multiplicity of documents, for example, bank-notes. So far as the present invention concerns the testing of bank notes, it would normally be performed at a late stage in the production process after the bank-notes have been printed but before they are separated from each other by the severing of the common web of paper on which they are printed. However, other techniques of presentation (e.g. as separate sheets) are feasible.

The web 1 is passed, normally at high speed, round a roller 3 and the web is scanned along a transverse region 4 by means of a line scan camera 5, which may be of known form. In general, although in the broadest aspect of the invention a television camera or an appropriately modified form thereof may be used for scanning a document to provide, after preferably analogue-to-digital conversion of the output of the television camera, a pixel representation of the document which is scanned, in general a camera scanning at a television rate is far too slow for the preferred use of the present invention and a high speed line scan camera would be used.

It is, normally, necessary to provide appropriate synchronisation of the scanning by the camera with the transport of the web 1 and for this purpose the apparatus shown in FIG. 1 includes a shaft encoder 6 providing information on the instantaneous circumferential position of the roller 1 to a synchronisation control unit 7. Since the control of a line scan in this way is a known technique, and the particular method employed is not critical to the present invention, it will not be described further herein.

Figure 2:
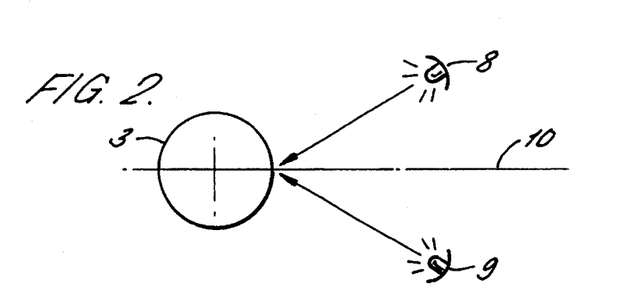
FIG. 2 illustrates a typical method of illumination of the web.

FIG. 2 illustrates merely by way of example a preferred illumination of the region which is scanned; the illumination preferably, consists of lamps 8 and 9 equally laterally displaced from a scanning plane 10 normal to the periphery of the roller 3.

Figure 3:
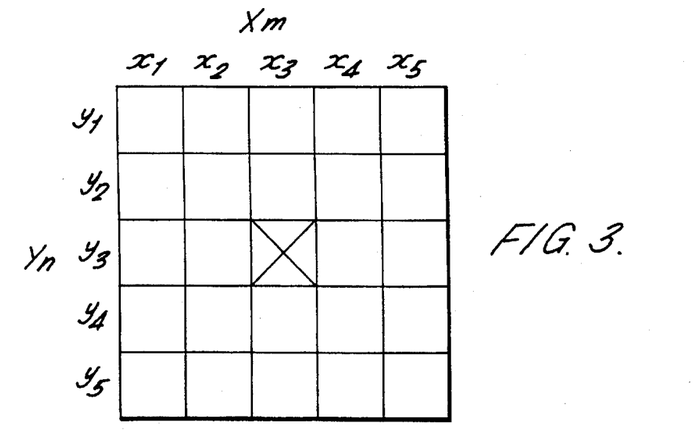
FIG. 3 is an explanatory diagram showing a target pixel in a neighbourhood of pixels.

It will be presumed that for the performance of the present invention so far as testing is concerned the line scan camera or other scanning means can provide a representation of the scanned document in the form of a multiplicity of picture elements (pixels) each of which has a brightness value (i.e. reflectance, density or other parameter of the pixel) corresponding to an elementary picture area of the scanned document. Preferably, though not essentially, the brightness value is expressed in the form of a digital word of eight bits, so that the pixel value is expressed in terms of a grey scale extending from zero, representing absolute black to 255, representing white. However, other total ranges of brightness values can be employed instead if preferred. Before FIG. 3 is considered, it may be assumed that a master document, that is to say a document such as a bank-note which, for the purpose of testing other bank-notes is presumed to be perfect, notwithstanding the probability that it will have minor imperfections, is scanned to provide a multiplicity of pixels each representing an elementary area thereof. Although in general the pixel values would be stored in retrievable locations in a memory device such as a frame store, and the positions of the pixel values in the frame store would be determined primarily by the convenience of storage or retrieval, for the purpose of explanation FIG. 3 illustrates a small neighbourhood of pixels in the locations of the corresponding elementary areas of the image or document that is scanned to provide the pixels. FIG. 3 shows purely for the sake of example, a 5×5 matrix of pixels, each element in the array being the pixel $(x_m, y_n)$ where m can have any value from 1 to 5 and n can have any value from 1 to 5. As will be seen, the choice of a square matrix is purely for the purpose of explanation and it is not essential even to choose a rectangular matrix.

Let us suppose that the given pixel which it is desired to represent is the pixel $(x_3, y_3)$. On the assumption that sufficient speed of data handling could be achieved, then in the absence of aberration, this pixel could be compared with a pixel in exactly the same position in a scanned image. However, as noted previously, printing aberrations, dimensional changes of paper and other aberrations mean, in general, that the corresponding pixel in the tested document could actually occur in any one of the element positions of the 5×5 matrix shown in FIG. 3.

Figure 5:
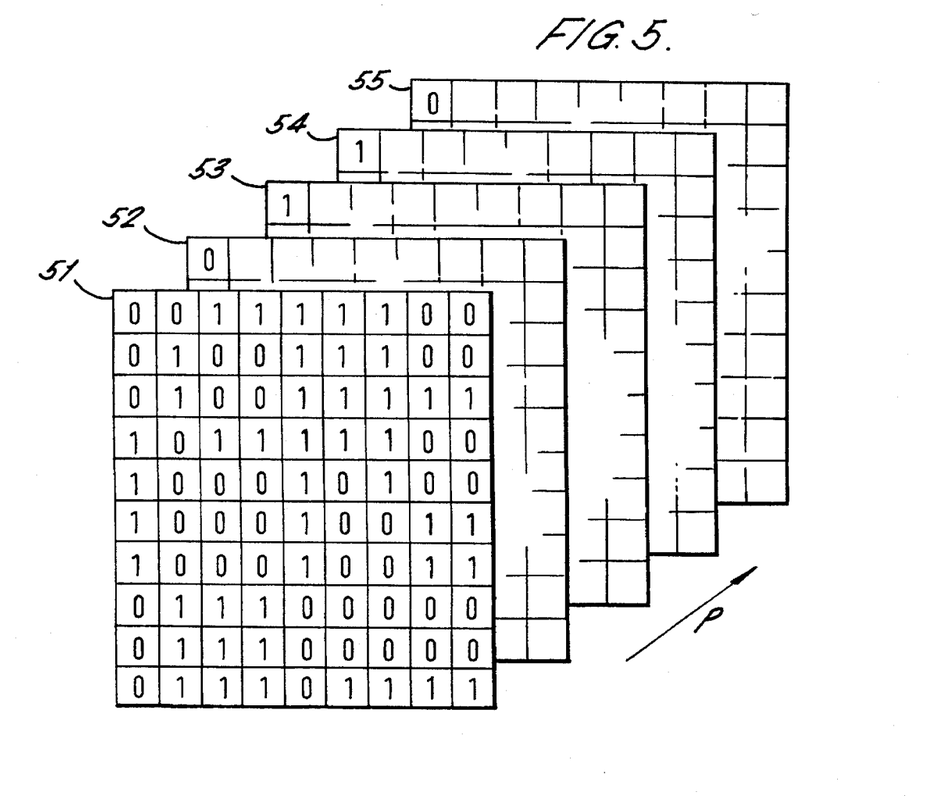
FIG. 5 illustrates, for explanatory purposes only, a set of arrays of matrix values.

As noted previously, one aspect of the present invention consists in defining, for each target or given pixel, a matrix of pixels, such as the matrix shown in FIG. 5, in the neighbourhood of the target pixel. The dimensions of the matrix and thus the particular configuration of pixels which is chosen to represent the given pixel may be chosen to suit the characteristics of the media, the printing technology or other factors in the production of the document which is being examined.

It is, for example, common to find that in the printing of a document the paper stretches more in one direction than the other and thus the aspect ratio of the matrix used for the representation of the given pixel may be chosen accordingly. Moreover, the size or configuration of the pixel can be varied within a given "master image" in the event that the criteria of acceptability vary over the area of the image.

In general, any element in the matrix can be made a null; this constitutes a prohibition on the occurrence of a target pixel at the respective locations.

Figure 4A:
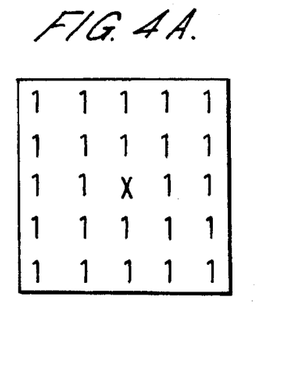
FIGS. 4A, 4B and 4C illustrate various forms of pixel matrices as proposed in the present invention.
Figure 4B:
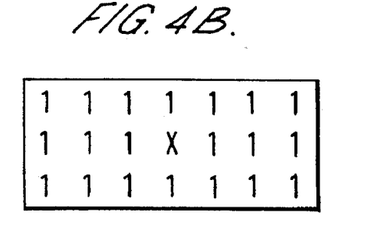
Figure 4C:
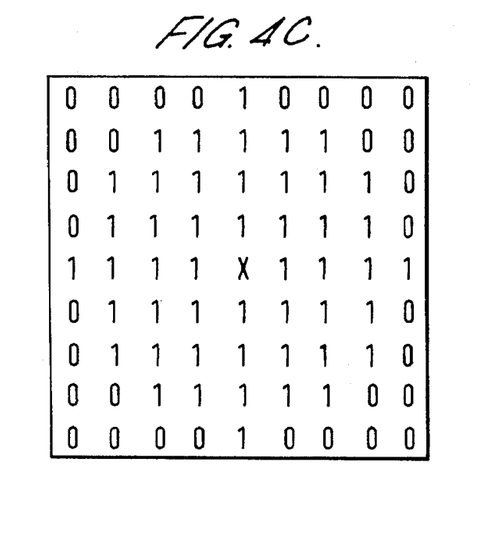

In FIG. 4 are shown three examples of different matrix representations, which can conveniently be called aberration patterns since they define an acceptable configuration or pattern of a tolerable aberration in the tested image even though the aberration is represented as occurring in the master image. FIG. 4A illustrates a 5×5 matrix with the target pixel (X) at the centre; the other elements in the matrix are shown as "1" merely to indicate that they are present in the defined matrix. Likewise, FIG. 4B illustrates a 7×3 matrix. FIG. 4C illustrates a matrix which is based on a 9×9 square matrix but is a development according to which various peripheral elements of the 9×9 matrix are assigned a null value so that the remaining elements define an approximately circular matrix or neighbourhood around the target pixel X. Various other suitable patterns can be devised according to preference.

It will be understood that if any given pixel has or should have any particular grey scale value, there is for the corresponding pixel derived from scanning the tested document a probability that the pixels within a given range or neighbourhood will have brightness values within a finite range, the probability density being a function of both the x and y directions in FIG. 3. The choice of matrix and range of values associated therewith may be selected in accordance with the presumed or permissible spread of the probability function. It is not thought necessary here to justify the basis of the present invention in terms of a mathematical analysis; nevertheless it is appropriate to say that the choice which the invention provides of varying the area and shape of the matrix of pixels chosen to represent the given pixel and the choice of brightness or grey scale range to be associated with that matrix provides a powerful technique for determining the limits of tolerable aberration of a master image.

It would be possible to develop a mathematical model, in signal form, by developing for each selected pixel a respective matrix and a single respective range of values in accordance with the criterion of acceptability appropriate for the given pixel. The range of values could vary from matrix to matrix so that it comprised a range of values embracing the measured value for the given master pixel. For example, one pixel measured in the master matrix to have a grey scale value of 120 may be represented by an m by n matrix, where m and n are selectable and the range associated with that matrix could vary from grey scale value 115 to 125. In another part of the image a pixel measured to have a grey scale value of 85 could be associated with a matrix for which the range extends from 80 to 90 or perhaps from 75 to 95, according to preference. However, though in some circumstances this may provide an acceptable technique, it is more convenient and more beneficial in terms of high speed processing to adopt the technique about to be outlined.

In a development of the technique just described, a matrix is defined for each master pixel and, by means of scanning a master document the measured brightness or grey scale value is determined for each selected master pixel. Then a multiplicity of ranges of brightness or grey scale values is defined. These ranges preferably, though in general need not, extend throughout a complete range of brightness or grey scale values. For example, a first range may extend from grey scale values 0 to 20. A second range may extend from grey scale value 15 to 55. A third range can extend from grey scale value 30 to grey scale value 50 and so on. Preferably as just stated the grey scale or brightness ranges overlap. Then, for each selected pixel there is by consideration of the brightness or grey scale values of all the pixels in the neighbourhood constituted by the defined matrix a determination of whether all the pixel values fall within each of the defined ranges. If for any given range this condition holds, the matrix can be represented by a particular signal value, conveniently a single bit binary value which is preferably chosen as a 1. For any range for which the condition does not hold, the respective value allotted to the matrix for that given range of values will be another signal value, preferably 0. In this manner one may develop, for each range of values, a respective array of signals which are composed of, preferably, ones and zeros. This is shown purely schematically in FIG. 5. It will of course be understood that each set of values is merely a collection of individually addressable signals but the representation is convenient for purposes of explanation.

Thus, in greatly simplified form since in general the number of ranges is to be much greater than five and the number of pixels far greater than shown in FIG. 5, the entire master document may be represented by a plurality of arrays 51 to 55 of signals, preferably binary signals. Each element of the array shows the binary signal value attributed to a respective matrix associated with a respective master pixel, the binary value being 1 if all the pixel values in that matrix fall within the respective defined range of brightness values associated with that array. Each arrays conveniently called a "gating array" has elements relating to the same defined matrices as the other arrays but differ from each other according to whether the pixels in each defined matrix all have brightness values falling within the respective range of values associated with the respective array.

As previously mentioned the development of the arrays may be reiterated to provide final arrays for representing the signal model of the master image.

It may therefore be seen that for any given pixel there is a defined matrix which is associated with a set of values, preferably a binary digital word of which the bits are each represented in a respective one of the gating arrays. The binary word associated with the matrix values occupying the top left-hand position in each array is shown as 00110. This means that all the pixels in the respective matrix have brightness values which fall within the two ranges of brightness values respectively associated with the arrays 53 and 54 and do not have brightness values which fall within the three ranges of brightness associated respectively with the arrays 51, 52 and 55. It is, of course, necessary to perform substantial computation on the obtained pixel values of a master document in order to produce the representation in signal form illustrated purely schematically in FIG. 5. Nevertheless, the technique is particularly useful because the process need only be performed once whereupon an image model of the master document is available in convenient form for extensive subsequent use in testing documents in large quantities against the image model representing the standard document.

Although it is presumed in the foregoing that the gating arrays shown in FIG. 5 are developed by firstly scanning a master document and thereafter performing the computing required to produce the binary representations of all the defined matrices for all the defined ranges of grey scale values, it may be possible to produce the gating arrays directly without using scanning. This could obviously be done for very simple cases though currently is not reckoned to be practical for a complex image.

An important advantage of the use of a multiplicity of arrays of signal values to represent the matrices associated with master pixels and thereby to represent the individual pixels lies in the ability to test a pixel from a tested document very rapidly using a plurality of comparators each set for the range of values associated with each gating array and making a multiplicity of simultaneous comparisons of the brightness value of the pixel by means of the comparators which are gated to make the comparison only if the binary value for the particular range indicates that all the pixels defined for that matrix have brightness values within the respective range. Thus the operation required for testing a given pixel obtained by scanning a document under test need consist only of reading out the respective digital word from a memory storing the "gating arrays" and feeding the pixel value word simultaneously to a multiplicity of comparators each controlled by a respective bit of the matrix data word and each set to compare the pixel value with the range of values appropriate for the respective array of binary matrix values. It is convenient to inhibit (i.e. prevent or disregard) the comparison whenever the data bit indicates that no comparison is meaningful, that is to say when for example the respective data bit is a zero as explained with reference to FIG. 5.

The technique thus described makes possible, if desired, the examination of pixels in real time provided only that the comparison circuitry can perform at the pixel rate provided by a scanning device for the tested document. This in turn means that the technique of examination can be performed without requiring excessive speed or storage capacity.

FIG. 6 illustrates again schematically an apparatus for performing examination of printed documents by a technique as just described.

Figure 6:
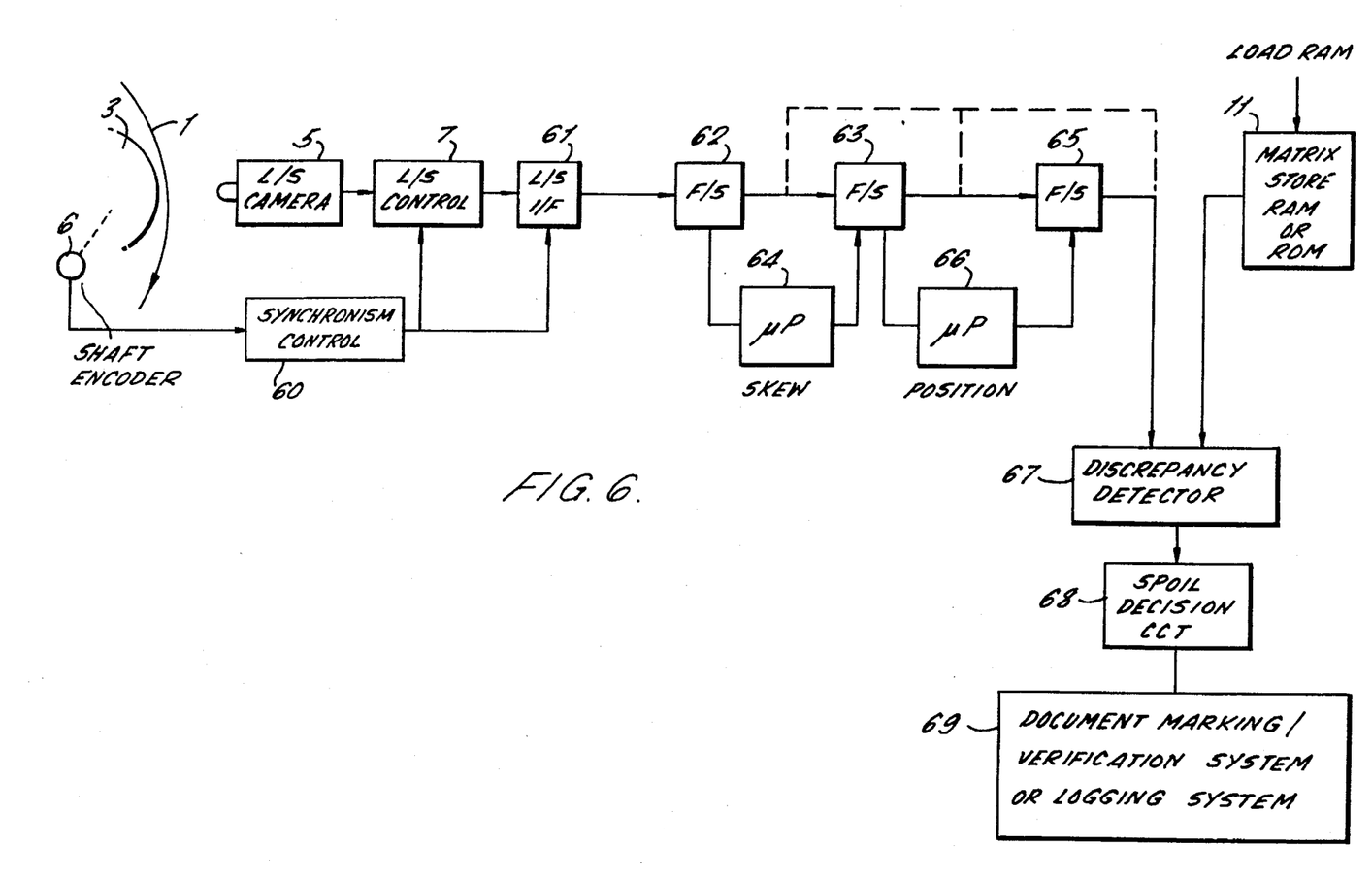
FIG. 6 illustrates schematically an apparatus for the scanning and testing of a printed document employing a special representation of a master document in signal form.

In the apparatus shown in FIG. 6 is included a matrix store 11 which may be in the form of a random access memory which is loaded with signals constituting a multiplicity of gating arrays as schematically shown in FIG. 5. It will be understood that the matrix store must be capable of reading out, for each pixel obtained from scanning a document under test, the digital word for the corresponding matrix defined for the nominally corresponding pixel in the master document or image. However, this is a matter of known computing technique and need not be described further herein.

FIG. 6 includes the web 1, the drum 5, the line scan camera 5, the shaft encoder 6 and the line scan control 7 as previously described with reference to FIG. 1. The set of pixels obtained by scanning a printed document on the web 1 is fed through a line scan interface, which may be of known construction, to a frame store 62. Such a frame store may be constructed on the same lines as for a frame store used in digital television processing but in general will differ therefrom only by possessing a larger capacity.

As briefly indicated hereinbefore, it is practically impossible to ensure that a document presented for scanning is presented in exactly the correct aspect or position and the apparatus shown in FIG. 6 includes a frame store 63 with controlled coupling to the frame store 62 by means of a microprocessor 64 and a further frame store 65 with controlled coupling to the frame store 63 by means of a microprocessor 66. The microprocessors 64 and 66 in conjunction with the frame stores 63 and 65 are provided in order to correct the image of the document as obtained by the line scan camera for skew and translation errors. Also as previously mentioned, this operation, though important, is not part of the inventive concept of the present invention and since computer graphical techniques exist for the correction of skew and translation errors and will therefore be familiar to those skilled in the art, they will not be further described herein.

In order to test each selected pixel, which in general will be all the pixels for the given document but could be merely a selection of pixels therefrom, each pixel or selected pixel is read out from the frame store 63 in synchronism with the reading out of the respective digital word from the matrix store 11. FIG. 6 does not show, purely for the sake of convenience and simplicity of explanation the timing circuits necessary for ensuring synchronism but, once again, such techniques are known to those skilled in the art and do not need further description herein.

Thus each pixel value is fed together with a respective data word from a matrix store 11 to a discrepancy detector 67 which is coupled to a spoil decision circuit 68 coupled to a system 69 which will be described later.

The operation of the system of FIG. 6 follows the flow chart shown in FIG. 8; the discrepancy detector 67 in FIG. 6 will be described later with reference to FIG. 7.

Figure 8:
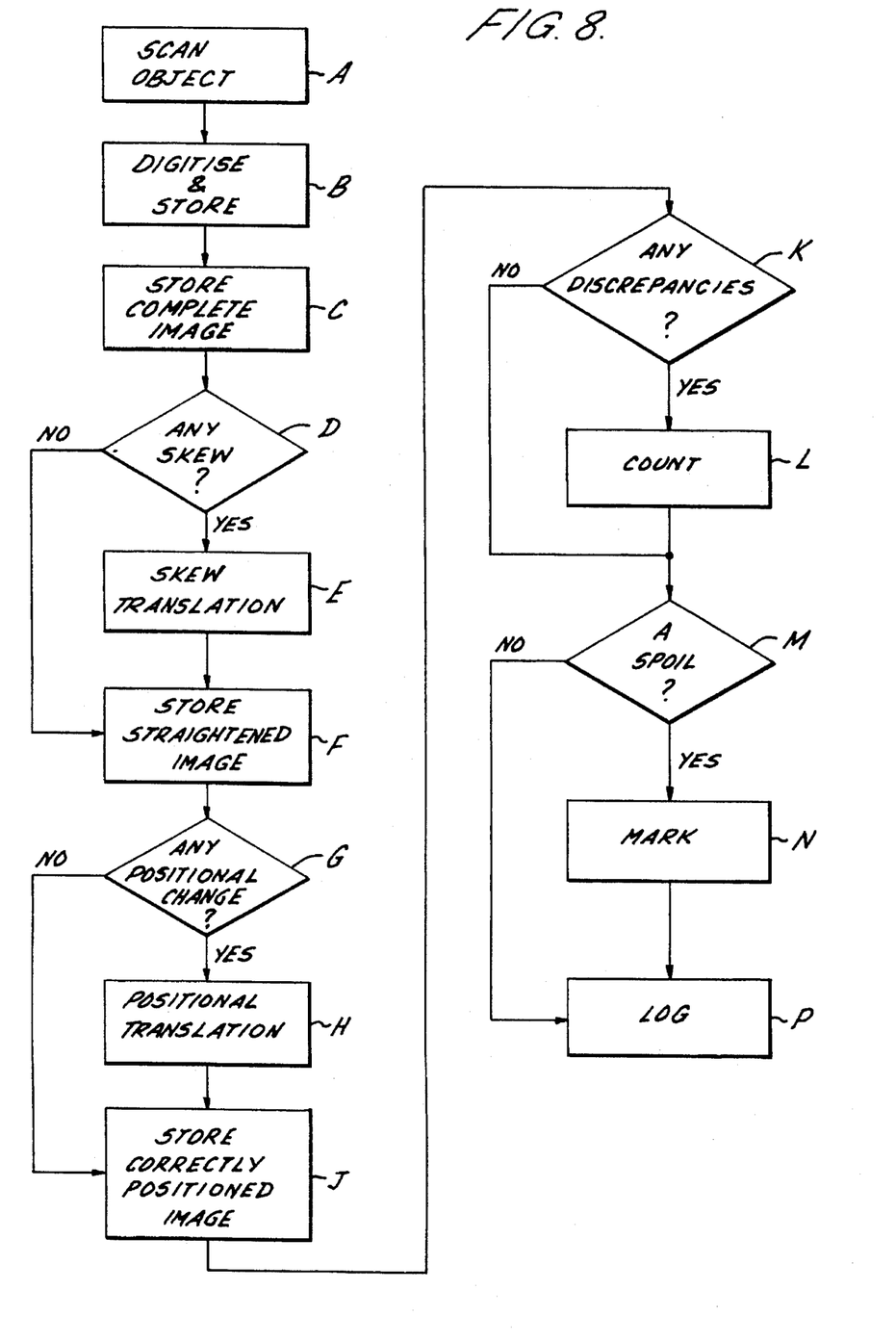
FIG. 8 is a flow diagram illustrating a preferred method of testing.

With reference to FIGS. 6 and 8, the object, in this embodiment in sheet form, is scanned one line at a time (step A in FIG. 8) by the line scan camera when synchronism with the object's movement has been established by means of a synchronism control 60 (which may be in known form). This line of information is digitised and stored (step B in FIG. 8) by the line scan control 7 and line scan interface 61. The process is repeated until the line scan interface is filled with a predetermined number of lines. The actual number of lines would be determined by the resolution required to achieve the level and degree of inspection accuracy required.

When the line scan interface 61 has been filled, the complete frame of data (i.e. the digitised image of the object) is passed to the frame store 62 (step C). Upon completion of this process the line scan control and line scan interface are (in known manner) made ready to capture an image of the next object. During the capture of the image of the said next object, the digitised image in the frame store 62 can be interrogated for any skew in the image (step D). When the line scan interface is ready with the next image, as it transfers that image to the frame store 62 the latter's previous contents can be transferred (step F) to the frame store 63, the transfer taking into account (step E) any skew that has been detected in the image.

The contents of frame store 63 can now be interrogated (step G) for any positional changes within the image and when frame store transfer takes place the contents of frame store 63 can be transferred (step J) to frame store 65 taking any positional change into account (step H).

The contents of the frame store 65 can now be compared with the contents of the matrix store 11 by means of the discrepancy detector 67 (step K). Detected discrepancies can then be counted and/or mapped on a context basis by decision circuit 68 (step L) and at the completion of the cycle of examination the system makes a decision (step M), in accordance with the count of discrepancies, whether the object is "spoiled". Any such decision is passed to the marking and logging system 69 which may provide physical marking (step N) on any spoiled object and logging (step P) of such marking.

Figure 7:
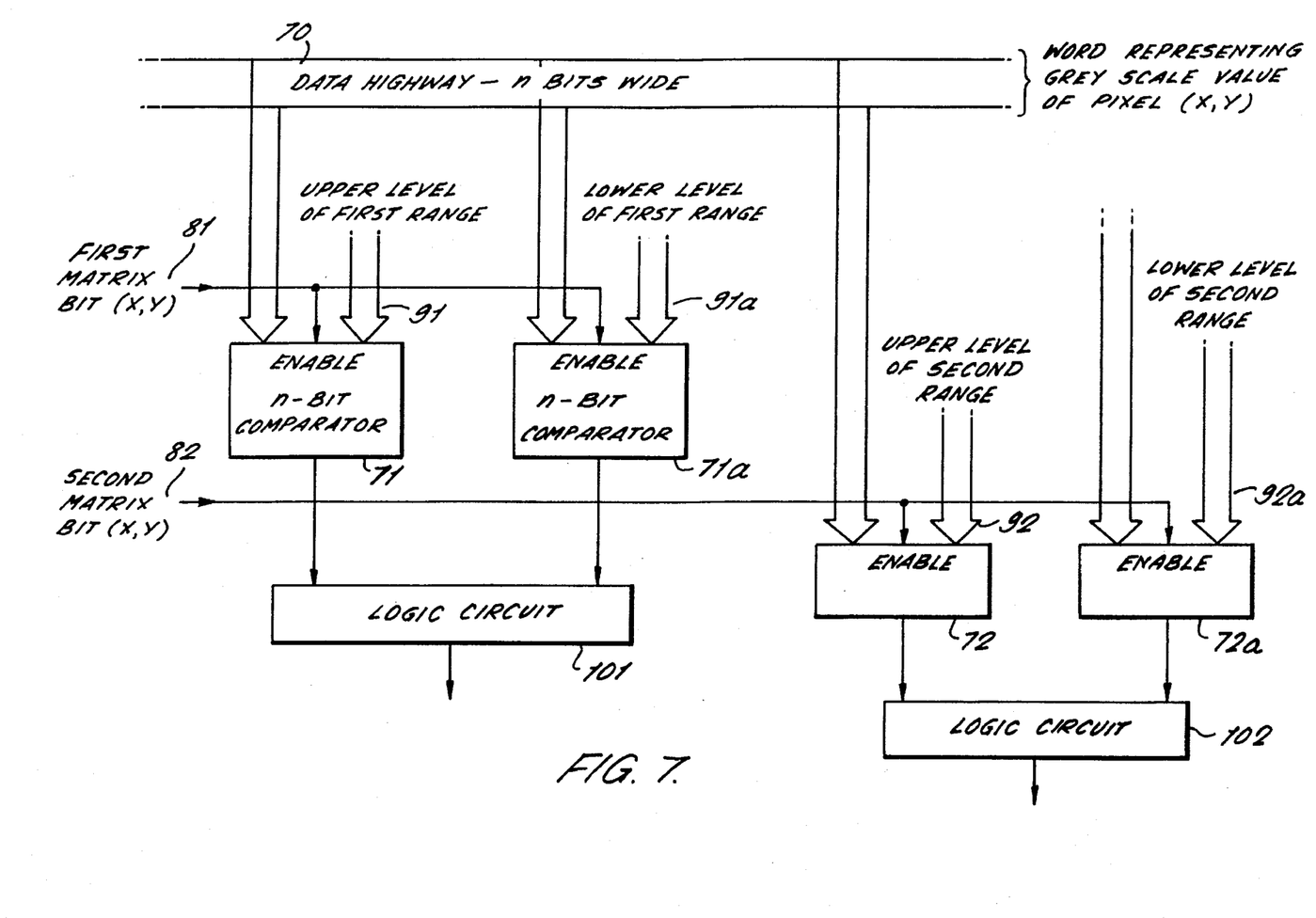
FIG. 7 illustrates a detail of a comparison circuit constituting the preferred embodiment of a discrepancy detector in the apparatus shown in FIG. 6.

FIG. 7 shows a data bus 70 on which the word representing the grey scale value of the current pixel is provided to the discrepancy detector. This data bus extends to each of a plurality of comparators 71, 71a, 72, 72a etc., (the remaining comparators being omitted), there being one comparator system (each including two comparators) for each of the gating arrays, that is to say one comparator system for each bit of the data word from the matrix store 11. To the enable input of each pair of comparators is fed the respective bit of the matrix data word from the store 11 from respective lines 81, 82 etc.

For convenience only the operation of the first comparator system need be described. The operation of the others is similar, except that the pixel value is therein compared with the respective brightness range associated with a second or subsequent bit of the matrix data word. The comparator 71 receives from any suitable source via lines 91 a digital word corresponding to the upper level of the first range, that is to say the range associated with the first gating array with which the first bit in the matrix data word is associated. Likewise, the comparator 71a receives from any suitable source via lines 91a a digital word corresponding to the lower level of the first range as aforesaid. If the respective matrix word bit is of the first binary value (i.e. 1) the comparators 71 and 71a test the (8-bit) pixel value word against the (8-bit) words corresponding to the upper and lower levels respectively of the first range and are coupled to a respective one of the output logic circuits 101, 102, etc. The logic circuit 101 provides an output of one binary value or another according to whether the grey scale value falls within the range defined by the upper level defined on the lines 91 and the lower level defined on the lines 91a or is outside the range thus defined.

The comparison of the pixel word with the respective range is inhibited if the relevant bit in the data word is of the second binary value (i.e. 0). It is alternatively possible to provide gates after the comparators so that comparison is always made but disregarded if the relevant matrix bit is 0 (using the convention previously adopted).

If for any comparison that is effectively made the comparison systems produce a signal indicating that the grey scale value of the respective pixel falls outside a range with which it is compared, the discrepancy detector provides an output to the decision circuit 68.

The decision circuit 68 may if desired accumulate a record of defects and provide an output only if the detected defects or discrepancies exceed some predetermined value but the nature of the decision circuit is not important to the present invention. It can readily be arranged in any desired manner to produce an output indicating that according to the selected criteria, the document which has been examined is defective or unacceptable and the output of the spoil decision circuit is fed, in this embodiment of the invention to the document marking/verification or logging system 69. In addition to the marking and logging previously described, the system 69 may indicate that not only a document in a particular batch is defective but that the whole batch should be rejected; it may indicate the number of defective documents in particular batches or merely signal to a user that particular documents require further visual inspection before they can be accepted or finally rejected.

The term "sheet" is intended to include both an individual sheet and part of a continuous web.

I claim:

1. A method of developing an array of signal values from a reference image composed of pixels, comprising:

defining a predetermined range of brightness values;

for each selected pixel in the reference image:

defining a matrix composed of a multiplicity of pixels in a region neighboring and including said pixel;

providing a first signal value corresponding to said selected pixel when all the multiplicity of pixels in said matrix of neighboring pixels have a brightness value within said predetermined range of brightness values; and providing a second signal value corresponding to said pixel when any one of the pixels in said matrix of neighboring pixels has a brightness value outside said range.

2. A method according to claim 1 and further comprising:

repeatedly utilizing said signal values and said range of brightness values to validate the brightness of nominally corresponding pixels in a plurality of secondary images.

3. A method according to claim 1 and further comprising:

developing a plurality of said arrays of signal values wherein the signal values are determined in each array of signal values using differently defined, predetermined ranges of brightness values.

4. A method according to claim 3 and further comprising:

repeatedly utilizing said plurality of arrays of signal values to validate the brightness of nominally corresponding pixels in a plurality of secondary images.

5. A method according to claim 3 in which the signal values are binary.

6. Apparatus for developing a signal model of an image, comprising:

means for providing a multiplicity of pixels each having a brightness value corresponding to the brightness value of a respective elementary area of said image;

means for examining, for each one of said pixels, the brightness value of said one pixel and the brightness value of each pixel in a respective matrix of pixels defined in the neighborhood of said one pixel; and means for providing in respect of each of said one pixels a first signal value if all the pixels in the said respective matrix are within a common range of brightness values; and for providing in respect of each of said one pixels a second signal value if any one of the pixels in said respective matrix has a brightness value outside said common range.

7. Apparatus according to claim 6 wherein said means for providing a multiplicity of pixels comprises means for scanning a document.

8. Apparatus according to claim 6 wherein said means for providing the first and second signal values comprises a random access memory.

9. A method of developing a signal model of a master image, comprising the steps of:

providing a first multiplicity of pixels each representing the brightness value of a respective elementary area of the image;

defining, for each said pixel, a respective matrix of pixels including the said pixel and neighboring pixels;

defining a plurality of different ranges of brightness values;

testing, for each said pixel, the brightness value of the pixels in the respective matrix against each of the said ranges; and providing, in accordance with the said testing, in respect of each said pixel and each range, a first binary value if all the pixels in the respective matrix have a brightness value within said each range, and a second binary value if any one of said pixels in the respective matrix has a brightness value outside said range, whereby each said pixel is represented by a respective multibit digital signal each bit of which is constituted by the first or second binary value according to the testing of the pixels in the respective matrix against the respective range.

10. A method according to claim 9 wherein the said different ranges of brightness values extend over a complete range of brightness values.

11. A method according to claim 9 wherein at least some of said different ranges overlap.

12. A method according to claim 9 wherein the step of providing said pixels comprises scanning a master document.

13. A method according to claim 9 further comprising providing in respect of a second image differing from said master image, a plurality of pixels, each pixel of said plurality of pixels nominally corresponding to a pixel of said master image;

provided a multiplicity of comparator means, the said multiplicity of comparator means corresponding in number to the number of bit positions in the multibit digital signals;

providing for each of the comparator means a testing range, each testing range corresponding to a respective one of said ranges of brightness values; and enabling the comparator means to test each pixel of the said plurality against the respective testing range in accordance with the binary value of the respective bit in the respective multibit word associated with the nominally corresponding pixel in the master image.

14. The method of representing a master image composed of a multiplicity of pixels, comprising the steps of:

measuring the brightness value of each of at least a plurality of target pixels of the master image;

developing a plurality of different brightness range value signals, each defining different upper and lower limits of measured brightness values which a pixel may have; and providing a plurality of arrays of first and second signals for each target pixel to represent permissible locations of pixels in each array and assigning a particular brightness range value signal to each array, the locations of the first signal in each array representing neighborhood locations at which a target pixel may fall during testing of an image intended to duplicate the master image and at which locations the brightness value of the pixel falling thereon may range between the upper and lower limits of the particular brightness range value signal assigned to that array, and the locations of the second signal in each array representing neighborhood locations at which a target pixel may fall during testing of an image intended to duplicate the master image and at which locations the brightness value of the pixel falling thereon is outside the upper and lower limits of the particular brightness range value signal assigned to that array.

15. The method as defined in claim 14 wherein said first and second signals are individual bits of a digital word.

* * * * *